(12) United States Patent
Chiu et al.

(10) Patent No.: US 9,043,024 B2
(45) Date of Patent: May 26, 2015

(54) VISION CORRECTION METHOD FOR TOOL CENTER POINT OF A ROBOT MANIPULATOR

(75) Inventors: Long-En Chiu, New Taipei (TW); Shu-Jun Fu, Shenzhen (CN); Gang Zhao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 449 days.

(21) Appl. No.: 13/414,919

(22) Filed: Mar. 8, 2012

(65) Prior Publication Data

US 2013/0035791 A1 Feb. 7, 2013

(30) Foreign Application Priority Data

Aug. 5, 2011 (CN) .......................... 2011 1 0223735

(51) Int. Cl.
*G05B 19/18* (2006.01)
*B25J 9/16* (2006.01)

(52) U.S. Cl.
CPC ..... *B25J 9/1692* (2013.01); *G05B 2219/39026* (2013.01)

(58) Field of Classification Search
USPC .............. 700/245–264; 318/560, 567, 568.1, 318/568.11; 901/4, 29, 42, 47
See application file for complete search history.

(56) References Cited

U.S. PATENT DOCUMENTS

| | | | | | |
|---|---|---|---|---|---|
| 4,969,108 | A | * | 11/1990 | Webb et al. | 700/259 |
| 5,727,132 | A | * | 3/1998 | Arimatsu et al. | 700/259 |
| 5,910,719 | A | | 6/1999 | Thorne | |
| 5,987,591 | A | * | 11/1999 | Jyumonji | 700/259 |
| 6,044,308 | A | * | 3/2000 | Huissoon | 700/166 |
| 6,292,715 | B1 | * | 9/2001 | Rongo | 700/249 |
| 6,430,472 | B1 | * | 8/2002 | Boillot et al. | 700/245 |
| 6,615,112 | B1 | * | 9/2003 | Roos | 700/254 |

(Continued)

FOREIGN PATENT DOCUMENTS

CN 101630409 A 1/2010

*Primary Examiner* — Jonathan L Sample
(74) *Attorney, Agent, or Firm* — Novak Druce Connolly Bove + Quigg LLP

(57) ABSTRACT

A vision correction method for establishing the position of a tool center point (TCP) for a robot manipulator includes the steps of: defining a preset position of the TCP; defining a preset coordinate system $T_G$ with the preset position of the TCP as its origin; capturing a two-dimensional picture of the preset coordinate system $T_G$ to establish a visual coordinate system $T_V$; calculating a scaling ratio $\lambda$ of the vision coordinate system $T_V$ relative to the preset coordinate system $T_G$; rotating the TCP relative to axes of the preset coordinate system $T_G$; capturing pictures of the TCP prior to and after rotation; calculating the deviation $\Delta P$ between the preset position and actual position of the TCP; correcting the preset position and corresponding coordinate system $T_G$ using $\Delta P$, and repeating the rotation through correction steps until $\Delta P$ is less than or equal to a maximum allowable deviation of the robot manipulator.

13 Claims, 8 Drawing Sheets

(56) References Cited

U.S. PATENT DOCUMENTS

| | | | |
|---|---|---|---|
| 7,161,321 B2* | 1/2007 | Ban et al. | 318/568.1 |
| 7,298,385 B2* | 11/2007 | Kazi et al. | 345/633 |
| 8,406,922 B2* | 3/2013 | Nemmers et al. | 700/254 |
| 2005/0107920 A1* | 5/2005 | Ban et al. | 700/245 |
| 2005/0225278 A1* | 10/2005 | Ban et al. | 318/568.11 |
| 2005/0273199 A1* | 12/2005 | Ban et al. | 700/248 |
| 2008/0252248 A1* | 10/2008 | Lundberg et al. | 318/572 |
| 2008/0300723 A1* | 12/2008 | Ban et al. | 700/259 |
| 2009/0118864 A1* | 5/2009 | Eldridge et al. | 700/259 |
| 2009/0145888 A1* | 6/2009 | Hesse et al. | 219/121.64 |
| 2009/0240372 A1* | 9/2009 | Bordyn et al. | 700/259 |
| 2011/0029131 A1* | 2/2011 | Ban et al. | 700/254 |
| 2011/0029132 A1* | 2/2011 | Nemmers et al. | 700/254 |

* cited by examiner

VISION CORRECTION METHOD FOR TOOL CENTER POINT OF A ROBOT MANIPULATOR

BACKGROUND

1. Technical Field

The present disclosure generally relates to correction methods for robot manipulators, and particularly to a vision correction method for tool center point of a robot manipulator.

2. Description of Related Art

Robot manipulators are used in various industrial fields to fulfill the task requirements for product assembling, welding and other tasks automatically. A robot manipulator of related art may be equipped with a tool, such as a gripper, a cutting device, a glue dispenser or a fixture mounted to a distal end thereof. The tool has a specific defined point, called the Tool Center Point (TCP), that is commanded to move to various positions in the workspace when a robot manipulator performs a task. In use, the positional accuracy of the robot manipulator directly depends on knowing the precise position of the TCP relative to the robot manipulator's distal end. Since the tool may have been mounted to the distal end of the robot manipulator manually, an alignment error may arise between the tool and the robot manipulator, causing the TCP to deviate from its expected position. Thus, to ensure tasks are performed with high positional accuracy, the position of the TCP relative to the robot manipulator's distal end must be calibrated to correct for tool misalignment after mounting or collision. Presently, the standard method for calibrating the TCP position requires an operator to visually guide the TCP to a specific point in the workspace with the tool at a minium of four different orientations. This is a time-consuming and inconvenient manual process, and the correction precision is not guaranteed. Automated calibration systems that use light beams to determine the TCP position are known in the art. However, these automated systems are not widely used due to their high cost, laborious setup process, or long calibration process time.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 2:
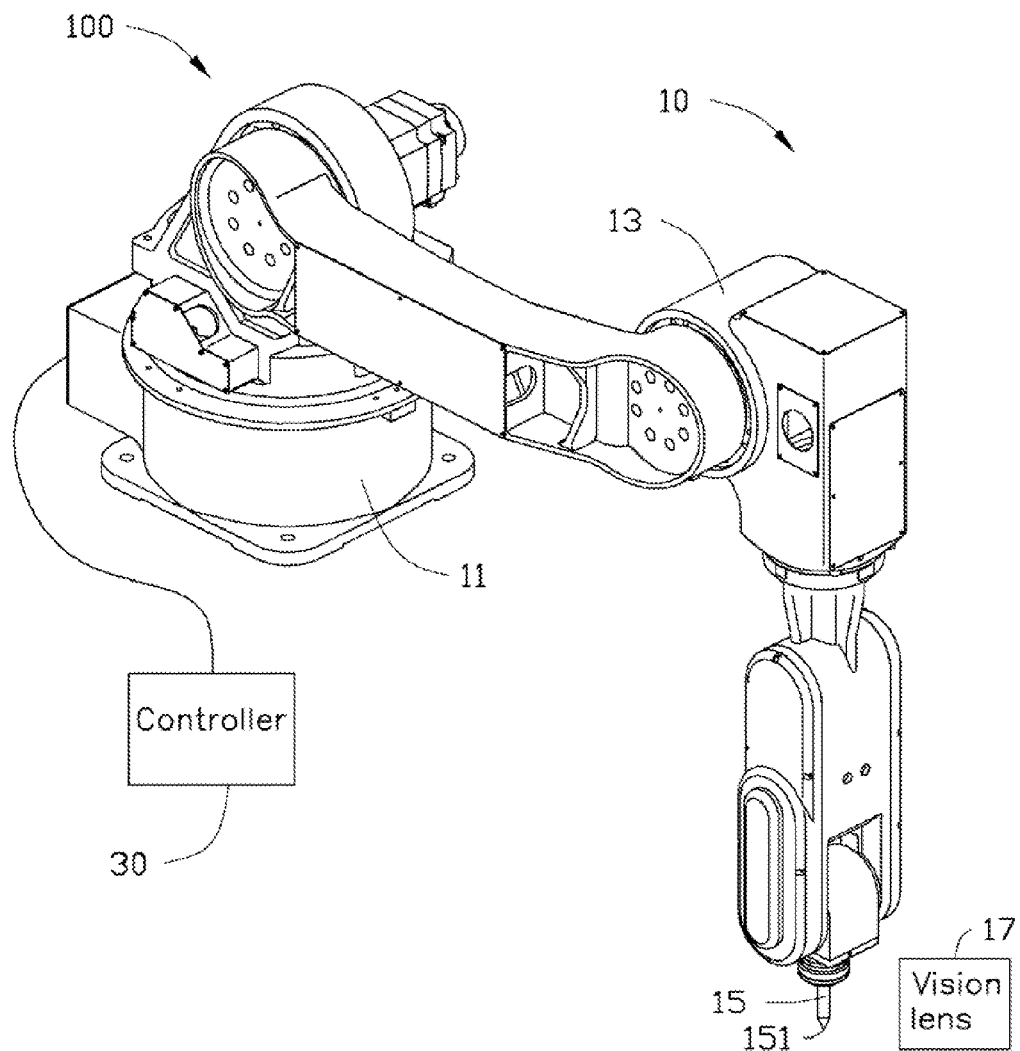
FIG. 2 shows an isometric view of the robot manipulator.
Figure 3:
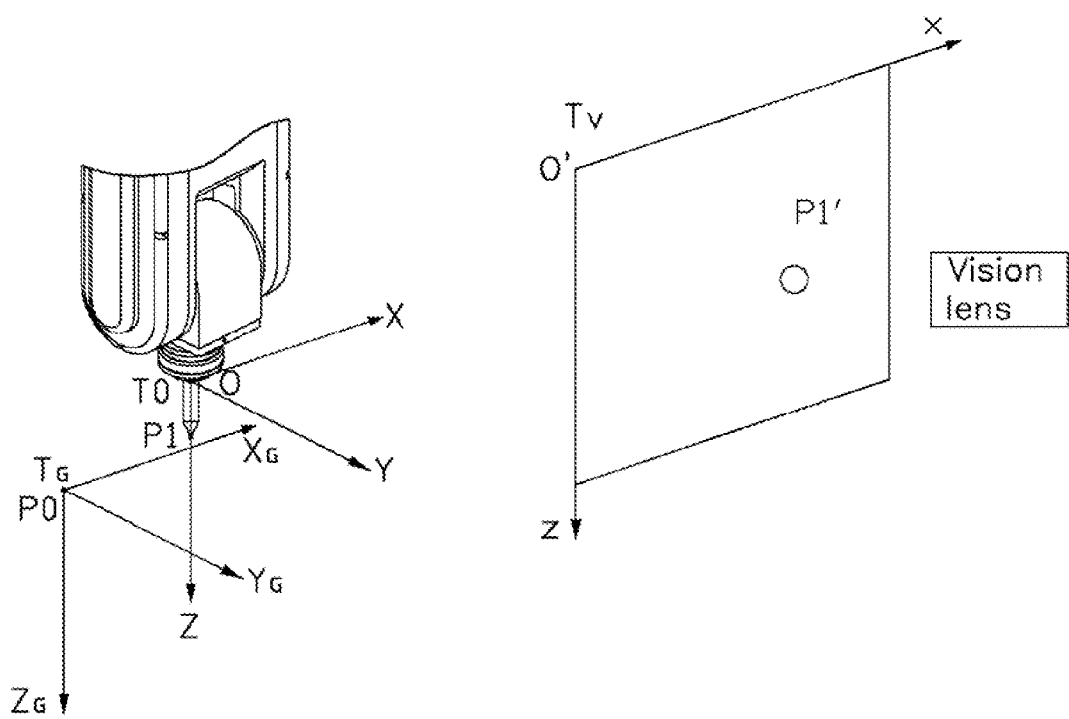
FIG. 3 shows a partially enlarged view of the robot manipulator of FIG. 2.

Referring to FIGS. 2 and 3, an embodiment of a robot manipulator 100 includes a main body 10 and a controller 30 connected to the main body 10. The main body 10 consists of multiple mechanical linkages and includes a base 11 and a drive mechanism 13 that moves the mechanical linkages. The drive mechanism 13 is mounted in the main body 10 and connected with the controller 30. A tool 15 is assembled to a distal end of the main body 10. A vision lens 17 is positioned to one side of the tool 15. The controller 30 includes a preset control software (not shown and not illustrated) and a data storage facility (also not shown and illustrated) installed therein for driving and controlling the drive mechanism 13 to move the tool 15. In the illustrated embodiment, the drive mechanism 13 is a multi-axis drive mechanism controlled by the controller 30. The tool 15 has a defined tool center point (TCP) 151 formed at a distal end of the tool 15. The vision lens 17 is configured for taking a plurality of different images of the tool 15. The robot manipulator 100 has a predefined basic coordinate system $T_0$ at the distal end of the main body 10. The basic coordinate system $T_0$ includes three coordinate axes (X-axis, Y-axis and Z-axis) intersecting with each other perpendicularly. A point of origin of the basic coordinate system $T_0$ is defined as O (0, 0, 0). This basic coordinate system is typically centered on a mounting flange at the distal end of the robot manipulator. After mounting the tool 15 onto the mounting flange, the TCP 151 of the tool 15 is positioned within the basic coordinate system $T_0$ of the robot manipulator 100. The position of the TCP 151 within the basic coordinate system $T_0$ is only known approximately due to tool misalignment after mounting; variances in tool fabrication also contributes to uncertainty in the position of the TCP 151. The object of the invention is to correct the position of the TCP 151 from an approximate value to a highly accurate value.

Figure 1:
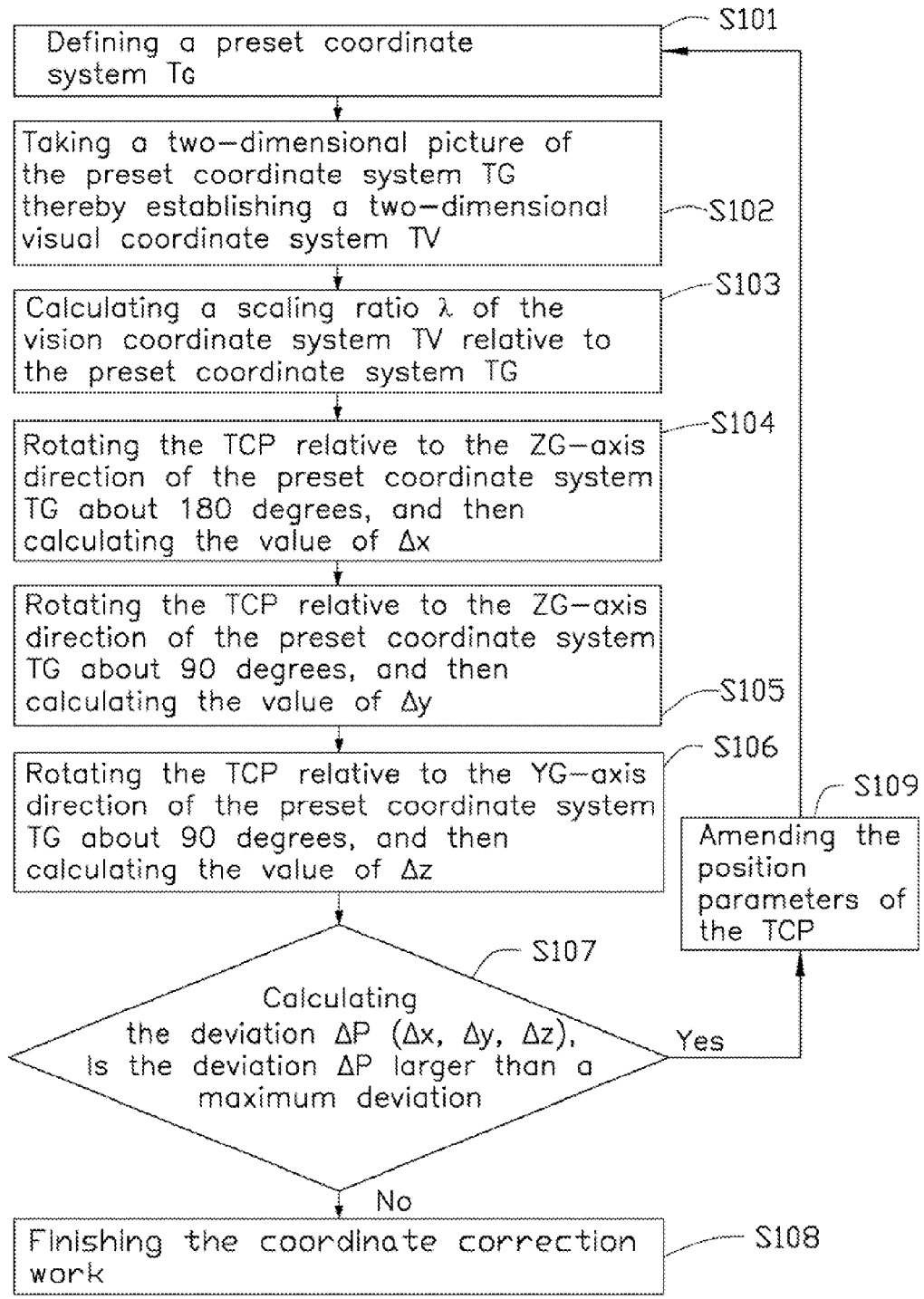
FIG. 1 shows a flow chart of an embodiment of a vision correction method for a tool center point of a robot manipulator.

Also referring to FIG. 1, a vision correction method of an embodiment for correcting the position of the TCP 151 of the robot manipulator 100 is illustrated as follows.

In step S101, a preset position of the TCP 151 of the tool 15 is defined as $P_0$; the preset position $P_0$ is an estimate of the actual position of the TCP 151 of the tool 15. The corresponding coordinate value of the preset position $P_0$ of the TCP 151 within the basic coordinate system $T_0$ is defined as $(X_g, Y_g, Z_g)$. A preset coordinate system $T_G$ is thus established based on the preset position $P_0$ of the TCP 151 of the tool 15. Specifically, the origin of the preset coordinate system $T_G$ is the preset position $P_0$ of the TCP 151 of the tool 15. The preset coordinate system $T_G$ includes three coordinate axes $X_G$-axis, $Y_G$-axis and $Z_G$-axis, each coordinate axis of the preset coordinate system $T_G$ is positioned parallel to the corresponding three coordinate axes X-axis, Y-axis and Z-axis of the basic coordinate system $T_0$. The coordinate value of the origin/preset position $P_0(X_g, Y_g, Z_g)$ of the preset coordinate system $T_G$ within the basic coordinate system $T_0$ is stored into the preset control software of the controller 30. During usage, the position of the preset position $P_0$ of the TCP 151 of the tool 15 can be adjusted and moved by adjusting the position parameters of the preset position $P_0$ of the TCP 151 of the tool 15 that are stored within the preset control software of the controller 30. The actual position of the TCP 151 of the tool 15 is defined as $P_1$, and thus, the corresponding coordinate value of the actual TCP 151 formed within the preset coordinate system $T_G$ is defined as $P_1(X_1, Y_1, Z_1)$. Any deviation between the preset position $P_0$ of the TCP 151 and the actual position of the TCP 151 ($P_1$) is defined as $\Delta P (\Delta x, \Delta y, \Delta z)$, namely, the deviation between the origin of the preset coordinate system $T_G(X_g, Y_g, Z_g)$ and the actual position of the TCP 151 ($P_1$) is defined as $\Delta P (\Delta x, \Delta y, \Delta z)$.

In step S102, the vision lens 17 is adjusted to aim at and be parallel to an $X_G Z_G$ plane of the preset coordinate system $T_G$. The vision lens 17 captures a two-dimensional picture of the $X_G Z_G$ plane of the preset coordinate system $T_G$. A two-dimensional visual coordinate system $T_V$ is established based on the two-dimensional picture of the $X_G Z_G$ plane of the preset coordinate system $T_G$. The origin of the two-dimensional visual coordinate system $T_V$ is defined as O' (0, 0). The two-dimensional visual coordinate system $T_V$ includes an x-axis and a z-axis intersecting with the x-axis perpendicularly. The x-axis and the z-axis are parallel to the corresponding $X_G$-axis and $Y_G$-axis of the preset coordinate system $T_G$ respectively. The corresponding coordinate value of the actual TCP 151 captured by the vision lens within the two-dimensional visual coordinate system $T_V$ is defined as $P_1'$ ($x_1$, $z_1$).

Figure 4:
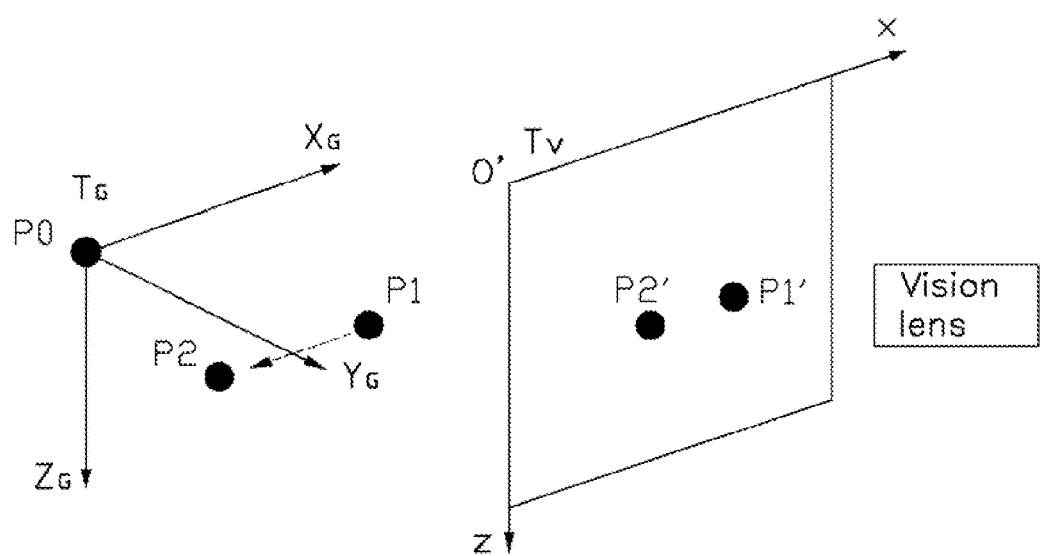
FIGS. 4 through 8 show five different coordinate views of the robot manipulator for illustrating the vision correction method for tool center point of the robot manipulator of the embodiment.

Also referring to FIG. 4, in step S103, the drive mechanism 13, controlled by the controller 30, causes the TCP 151 of the tool 15 to move along the $X_G$-axis direction and to finally stop at a position $P_2$ with a $X_G$-axis directional distance of about $X_2$. The corresponding coordinate value of the actual TCP 151 positioned at the position $P_2$ relative to the preset coordinate system $T_G$ can be figured as $P_2$ ($X_1-X_2$, 0, 0). The vision lens 17 then captures a picture of the TCP 151 of the tool 15 positioned at the position $P_2$. The corresponding coordinate value of the TCP 151 formed within the two-dimensional visual coordinate system $T_V$ can be calculated as $P_2'$ ($x_1-x_2$, $z_1$). And thus, the scaling ratio $\lambda$ of the vision coordinate system $T_V$ relative to the preset coordinate system $T_G$ can be easily calculated as $\lambda=(X_1-X_2)/(x_1-x_2)$.

Figure 5:
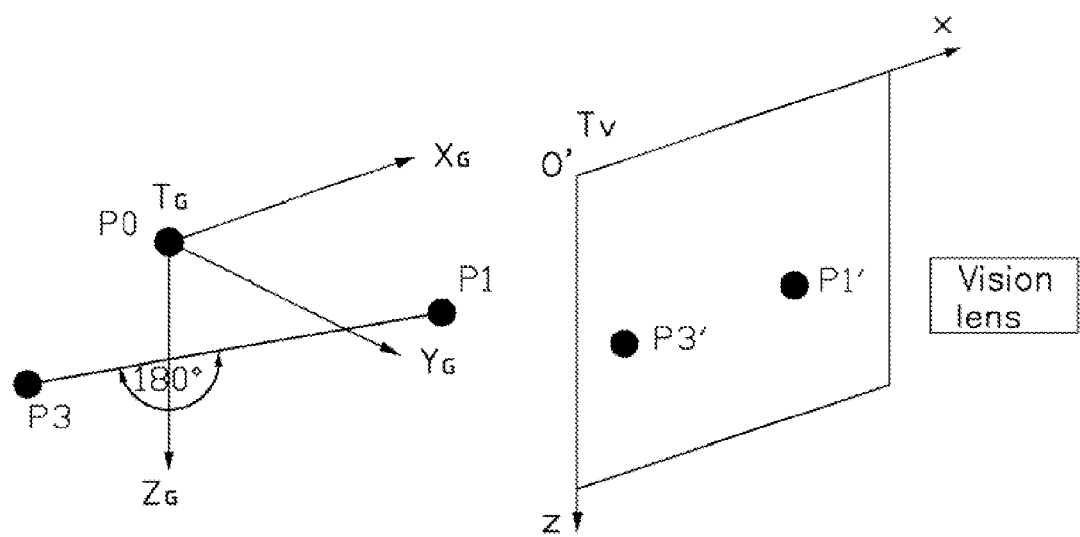

Also referring to FIG. 5, in step S104, the TCP 151 of the tool 15 is firstly moved back to its original position $P_1$, and then the TCP 151 of the tool 15 is driven to rotate about the $Z_G$-axis of the preset coordinate system $T_G$ by about 180 degrees, and finally stop at a position $P_3$. The corresponding coordinate value of the actual TCP 151 positioned at the position $P_3$ relative to the preset coordinate system $T_G$ can be figured as $P_3$ ($X_3$, $Y_3$, $Z_3$). The vision lens 17 captures a picture of the TCP 151 of the tool 15 positioned at the position $P_3$. The corresponding coordinate value of the TCP 151 formed within the two-dimensional visual coordinate system $T_V$ can be defined as $P_3'$ ($x_3$, $z_3$). The distance between the $x_3$ and $x_1$ as shown in visual coordinate system $T_V$ can be easily calculated. Since the TCP 151 of the tool 15 is rotated relative to the $Z_G$-axis direction of the preset coordinate system $T_G$ to about 180 degrees, the following mathematical functional relationships can be easily established: $X_1-X_3=2\Delta x$; $Z_3=Z_1$; $2\Delta x=\lambda(x_1-x_3)$. Thus the value of $\Delta x$ can be easily calculated by means of the aforementioned mathematical functional relationships.

Figure 6:
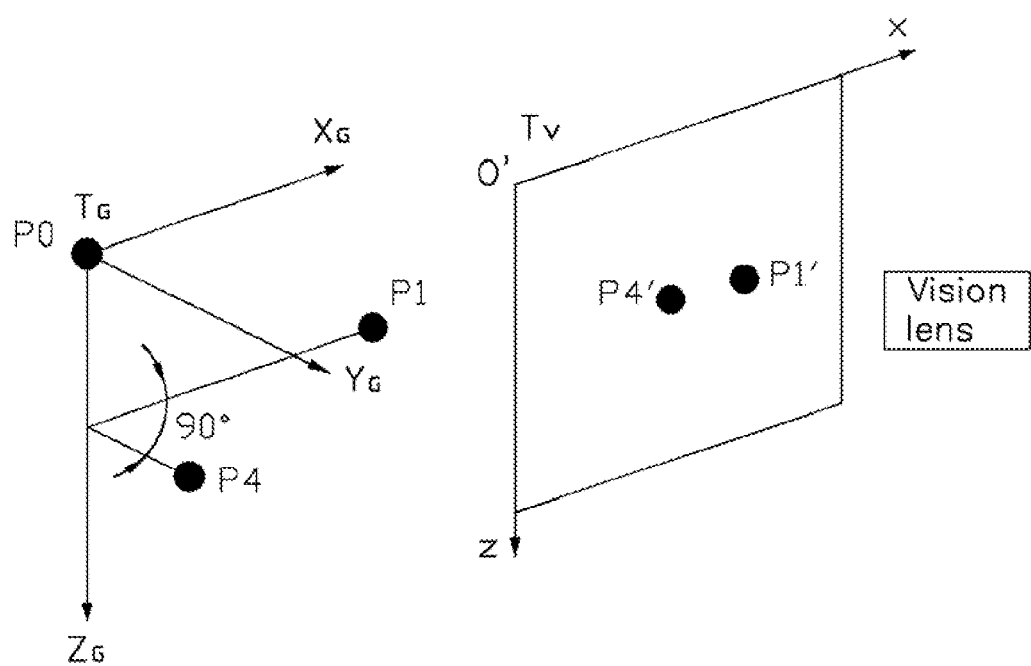

Also referring to FIG. 6, in step S105, the TCP 151 of the tool 15 is firstly moved back to its original position $P_1$, and then the TCP 151 of the tool 15 is driven to rotate by about 90 degrees relative to the $Z_G$-axis direction of the preset coordinate system $T_G$, and finally stop at a position $P_4$. The corresponding coordinate value of the actual TCP 151 positioned at the position $P_4$ relative to the preset coordinate system $T_G$ can be marked or designated as $P_4$ ($X_4$, $Y_4$, $Z_4$). The vision lens 17 captures a picture of the TCP 151 of the tool 15 positioned at the position $P_4$. The corresponding coordinate value of the TCP 151 formed within the two-dimensional visual coordinate system $T_V$ can be defined as $P_4'$ ($x_4$, $z_4$). The distance between the $x_4$ and $x_1$ as shown in visual coordinate system $T_V$ can be easily calculated. Since the TCP 151 of the tool 15 is rotated relative to the $Z_G$-axis direction of the preset coordinate system $T_G$ by about 90 degrees, the following mathematical function relationships can thus be easily defined: $X_1-X_4=\Delta x+\Delta y$; $Y_1-Y_4=\Delta y-\Delta x$; $Z_4=Z_1$; $\Delta x+\Delta y=X_1-X_4=\lambda(x_1-x_4)$. Thereby, since the value of $\Delta x$ has been calculated in the previous step S104, the value of $\Delta y$ can be calculated by means of the aforementioned functional relationships.

Figure 7:
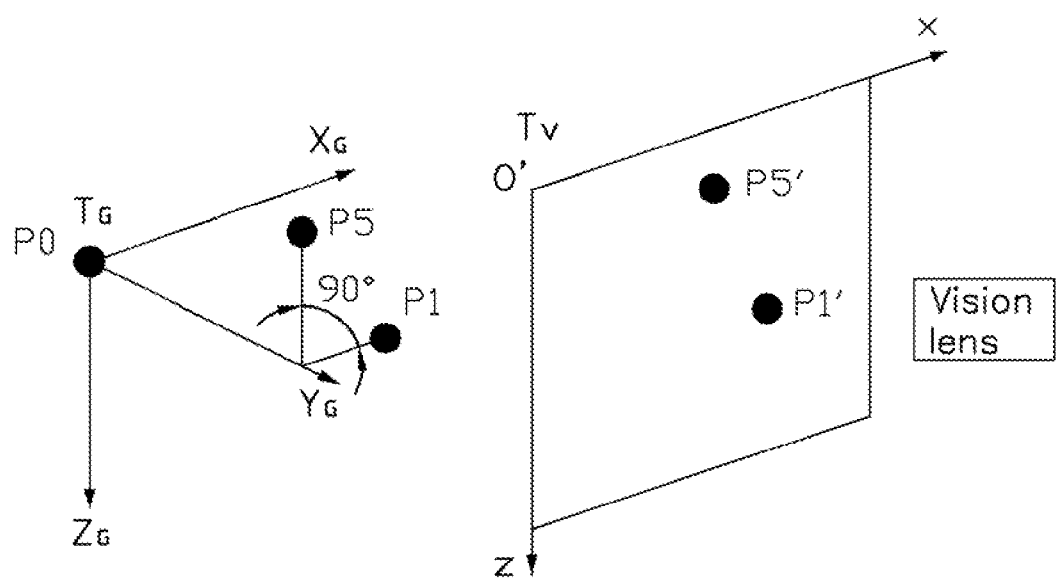

Also referring to FIG. 7, in step S106, the TCP 151 of the tool 15 is firstly moved back to its original position $P_1$, and then the TCP 151 of the tool 15 is driven to rotate about 90 degrees about the $Y_G$-axis direction of the preset coordinate system $T_G$, and finally stop at a position $P_5$. The corresponding coordinate value of the actual TCP 151 at the position $P_5$ relative to the preset coordinate system $T_G$ can be designated or marked as $P_5$ ($X_5$, $Y_5$, $Z_5$). The vision lens 17 captures a picture of the TCP 151 of the tool 15 when at the position $P_5$. The corresponding coordinate value of the TCP 151 formed within the two-dimensional visual coordinate system $T_V$ can be defined as $P_5'$ ($x_5$, $z_5$). The distance between the $z_5$ and $z_1$ as shown in visual coordinate system $T_V$ can be easily calculated. Since the TCP 151 of the tool 15 is rotated relative to the $Y_G$-axis direction of the preset coordinate system $T_G$ by about 90 degrees, thus the following functional relationships can be easily established: $Z_1-Z_5=\Delta x+\Delta z$; $X_1-X_5=\Delta x-\Delta z$; $\Delta x+\Delta z=Z_1-Z_5=\lambda(z_1-z_5)$. Thus value of $\Delta z$ can be easily calculated by means of the aforementioned relationships.

In step S107, the TCP 151 of the tool 15 is moved back to its original position $P_1$. The deviation $\Delta P$ ($\Delta x$, $\Delta y$, $\Delta z$) between the preset position $P_0$ of the TCP 151 and the actual position of the TCP 151 ($P_1$) is calculated by means of the aforementioned functional relationships and compared with the maximum allowable deviation of the robot manipulator 100.

In step S108, if the deviation $\Delta P$ ($\Delta x$, $\Delta y$, $\Delta z$) is less than or equal to the maximum allowable deviation of the robot manipulator 100, the preset position $P_0$ of the TCP 151 then can be considered as the actual position of the TCP 151 ($P_1$) thereby completing the coordinate correction work. By means of this procedure, there is no need to further correct the coordinates of the TCP 151 of the robot manipulator 100. The corresponding coordinate value ($X_g$, $Y_g$, $Z_g$) of the preset position $P_0$ of the TCP 151 within the basic coordinate system $T_0$ can be directly considered as the actual position of the TCP 151 ($P_1$).

Figure 8:
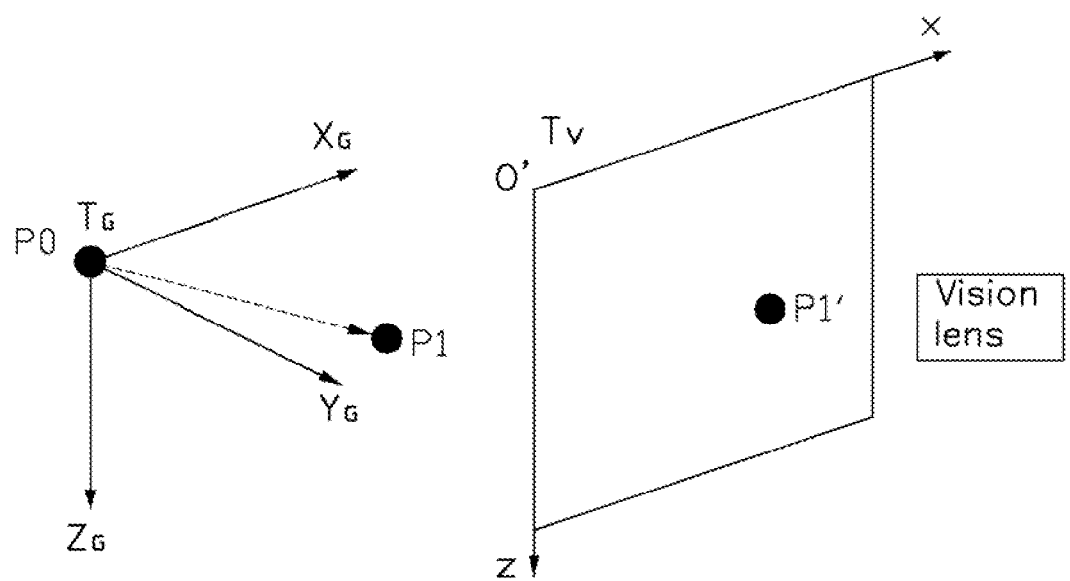

Also referring to FIG. 8, in step S109, if the magnitude of the deviation $\Delta P$ ($\Delta x$, $\Delta y$, $\Delta z$) is greater than the maximum allowable deviation of the robot manipulator 100, the position parameters of the preset position $P_0$ of the TCP 151 that are stored within the control software of the controller 30 then can be amended by adding a deviation $\Delta P$. Specifically, the preset position $P_0$ of the TCP 151 relative to the basic coordinate system $T_0$ is changed into ($Xg+\Delta x$, $Yg+\Delta y$, $Zg+\Delta z$). Thereby, the newly-changed coordinate value ($Xg+\Delta x$, $Yg+\Delta y$, $Zg+\Delta z$) of the preset position $P_0$ of the TCP 151 can be considered as the new preset position of the TCP 151, the aforementioned steps S101~S109 are repeated until the deviation between the preset position $P_0$ of the TCP 151 and the actual position of the TCP 151 is less than or equal to the maximum allowable deviation of the robot manipulator 100, to altogether complete the coordinate correction to the TCP 151 of the robot manipulator 100 and obtain the correct position of the actual TCP 151 relative to the basic coordinate system $T_0$. Correction usually cannot be completed in a single iteration through steps S101~S109, because alignment error between the vision coordinate system $T_V$ and the preset coordinate system $T_G$, vision lens distortion, and error in calibrating $\lambda$ will produce error in the calculation of $\Delta P$ ($\Delta x$, $\Delta y$, $\Delta z$). The error is reduced successively through each iteration of steps S101~S109.

In another embodiment, the coordinate axes of the preset coordinate system $T_G$ are not parallel to the corresponding coordinate axes of the basic coordinate system $T_0$. The basic coordinate system $T_0$ can also be defined at other positions, such as at the base 11.

In another embodiment, the vision lens 17 can also include a picture analysis unit to facilitate the calculation of the scaling ratio λ of the vision coordinate system $T_V$ relative to the preset coordinate system $T_G$, so that the step 103 is rendered non-fundamental or mandatory. The sequence of order of the steps S103, S104 and S105 is not fixed.

In another embodiment, the deviation ΔP (Δx, Δy, Δz) between the preset position $P_0$ of the TCP 151 and the actual position of the TCP $P_1$ can be established by other means. Another method to calculate the deviation ΔP (Δx, Δy, Δz) between the preset position of the TCP 151 and the actual position of the TCP 151 is as follows:

Firstly, the actual position of the TCP 151 of the tool 15 is defined as $P_T$, and the coordinate value of the actual TCP 151 formed within the preset coordinate system $T_G$ is defined as $P_T(X_T, Y_T, Z_T)$. The preset position of the TCP 151 of the tool 15 is defined as $P_G$, and the preset coordinate system $T_G$ is thus established based on the preset position $P_G$ of the TCP 151 of the tool 15. Since the origin of the preset coordinate system $T_G$ is the preset position $P_G$ of the TCP 151 of the tool 15, thus, the deviation ΔP (Δx, Δy, Δz) between the preset position of the TCP $P_G$ and the actual position of the TCP $P_T$ is calculable according to the following equations:

$$\Delta x = X_T; \Delta y = Y_T; \Delta z = Z_T. \quad \text{Equation (1)}$$

The vision lens 17 then takes a two-dimensional picture of the $X_G Z_G$ plane of the preset coordinate system $T_G$. A two-dimensional visual coordinate system $T_V$ is established based on the two-dimensional picture of the $X_G Z_G$ plane of the preset coordinate system $T_G$. The corresponding coordinate value of the actual TCP 151 formed within the two-dimensional visual coordinate system $T_V$ is defined as $P_T'(X_T', X_T')$.

Secondly, the TCP 151 of the tool 15 is rotated by the drive mechanism 13 relative to the $Z_G$-axis direction of the preset coordinate system $T_G$ about $\theta_1$ degrees, and finally stop at a position $P_{T1}$. The corresponding coordinate value of the actual TCP 151 positioned at the position $P_{T1}$ relative to the preset coordinate system $T_G$ can be denoted or designated as $P_{T1}(X_{T1}, Y_{T1}, Z_{T1})$. The vision lens 17 captures a picture of the TCP 151 of the tool 15 positioned at the position $P_{T1}$. The corresponding coordinate value of the TCP 151 formed within the two-dimensional visual coordinate system $T_V$ can be defined as $P_{T1}'(X_{T1}', Z_{T1}')$. The functional relationships between the coordinate value $P_T(X_T, Y_T, Z_T)$ of the actual TCP 151 and the coordinate value $P_{T1}(X_{T1}, Y_{T1}, Z_{T1})$ of the position $P_{T1}$ of the TCP 151 can be presented as follow in equation (2):

$$X_T - X_{T1} = X_T - \sqrt{X_T^2 + Y_T^2} \cdot \cos\left(\theta_1 + \arccos \frac{X_T}{\sqrt{X_T^2 + Y_T^2}}\right); \quad \text{Equation (2)}$$

since $X_T - X_{T1} = \lambda^*(x_T' - x_{T1}')$; $\Delta x = X_T$; and $\Delta y = Y_T$; the value of $x_T' - x_{T1}'$ can be calculated from the two-dimensional visual coordinate system $T_V$; and thus, a new formula, referred to as Equation (3):

$$\lambda * (X_T' - X_{T1}') = \quad \text{Equation (3)}$$
$$\Delta x - \sqrt{\Delta x^2 + \Delta y^2} \cdot \cos\left(\theta_1 + \arccos \frac{\Delta x}{\sqrt{\Delta x^2 + \Delta y^2}}\right)$$

can be established based on the aforementioned functional relationships.

Thirdly, the TCP 151 of the tool 15 is then moved back to its original position, and then the TCP 151 of the tool 15 is rotated relative to the $Y_G$-axis direction of the preset coordinate system $T_G$ about $\theta_2$ degrees, and finally stops at a position $P_{T2}$. The corresponding coordinate value of the actual TCP 151 positioned at the position $P_{T2}$ relative to the preset coordinate system $T_G$ can be figured as $P_{T2}(X_{T2}, Y_{T2}, Z_{T2})$. The vision lens 17 captures a picture of the TCP 151 of the tool 15 positioned at the position $P_{T2}$. The corresponding coordinate value of the TCP 151 formed within the two-dimensional visual coordinate system $T_V$ can be defined as $P_{T2}'(X_{T2}', z_{T2}')$. The functional relationships between the coordinate value $P_T(X_T, Y_T, Z_T)$ of the actual TCP 151 and the coordinate value $P_{T2}(X_{T2}, Y_{T2}, Z_{T2})$ of the position $P_{T2}$ of the TCP 151 can be established as follows, in equations (4) and (5):

$$X_T - X_{T2} = X_T - \sqrt{X_T^2 + Z_T^2} \cdot \cos\left(\theta_2 + \arccos \frac{X_T}{\sqrt{X_T^2 + Z_T^2}}\right); \quad \text{Equation (4)}$$

$$Z_T - Z_{T2} = Z_T - \sqrt{X_T^2 + Z_T^2} \cdot \cos\left(\theta_2 + \arccos \frac{Z_T}{\sqrt{X_T^2 + Z_T^2}}\right); \quad \text{Equation (5)}$$

Since $X_T - X_{T1} = \lambda^*(x_T' - x_{T1}')$; $Z_T - Z_{T1} = \lambda^*(z_T' - z_{T1}')$; $\Delta x = X_T$; $\Delta y = Y_T$; and $\Delta z = Z_T$; the value of $x_T' - x_{T2}'$ and $z_T' - z_{T2}'$ can be calculated from the two-dimensional visual coordinate system $T_V$; and thus, the following equations (6) and (7) can be formulated based on the aforementioned functional relationships:

$$\lambda * (X_T' - X_{T2}') = \quad \text{Equation (6)}$$
$$\Delta x - \sqrt{\Delta x^2 + \Delta z^2} \cdot \cos\left(\theta_2 + \arccos \frac{\Delta x}{\sqrt{\Delta x^2 + \Delta z^2}}\right)$$

$$\lambda * (Z_T' - Z_{T2}') = \quad \text{Equation (7)}$$
$$\Delta z - \sqrt{\Delta x^2 + \Delta z^2} \cdot \cos\left(\theta_2 + \arccos \frac{\Delta z}{\sqrt{\Delta x^2 + \Delta z^2}}\right)$$

The values of Δx, Δy, Δz can be determined by solving the aforementioned formulas in equations (3), (6) and (7). And thus, the deviation ΔP (Δx, Δy, Δz) between the preset position of the TCP 151 and the actual position of the TCP 151 is expressly defined.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A vision correction method for tool center point (TCP) of a robot manipulator, the robot manipulator comprising a main body, a drive mechanism, a controller for controlling the drive mechanism, a tool assembled to a distal end of the main body and having the TCP, and a vision lens positioned to one side of the tool; the robot manipulator predefining a basic coordinate system having three axes, the vision correction method comprising the following steps:

defining a preset position $P_0$ of the TCP and establishing a preset coordinate system $T_G$ based on the preset position $P_0$, defining the actual position of the TCP as $P_1$;

capturing a picture of the actual TCP and establishing a two-dimensional visual coordinate system $T_V$ based on the picture, defining the corresponding coordinate of the actual TCP formed within the two-dimensional visual coordinate system $T_V$ as $P_1'$;

calculating a scaling ratio $\lambda$ of the vision coordinate system $T_V$ relative to the preset coordinate system $T_G$;

driving the tool to rotate relative to one axis of the preset coordinate system $T_G$ by $\theta_1$ degrees, and obtaining the coordinate value $P_2$ of the TCP of the tool; capturing a picture of the actual TCP and obtaining the corresponding coordinate $P_2'$ of the actual TCP formed within the visual coordinate system $T_V$;

driving the tool to rotate relative to another axis of the preset coordinate system $T_G$ by $\theta_2$ degrees, and then obtaining the coordinate value $P_3$ of the TCP of the tool; capturing a picture of the actual TCP and obtaining the corresponding coordinate $P_3'$ of the actual TCP formed within the visual coordinate system $T_V$;

calculating a deviation $\Delta P$ between the preset position $P_0$ and the actual position $P_1$ of the TCP, and then comparing the deviation $\Delta P$ with a maximum allowable deviation of the robot manipulator;

wherein, if the deviation $\Delta P$ is less than or equal to the maximum allowable deviation of the robot manipulator, the preset position $P_0$ of the TCP is thereby considered as the actual position $P_1$ of the TCP and finishing the coordinate correction work; if the deviation $\Delta P$ is greater than the maximum allowable deviation of the robot manipulator, then, amending the position parameters of the preset position $P_0$ of the TCP, and repeating the vision correction method for tool center point till the final deviation is less than or equal to the maximum allowable deviation of the robot manipulator.

2. The vision correction method of claim 1, wherein the origin of the basic coordinate system $T_0$ is established at the distal end of the main body, the preset position $P_0$ is an estimated position close to the actual position of the TCP of the tool.

3. The vision correction method of claim 2, wherein the robot manipulator further comprises a base, the drive mechanism is mounted in the main body and connected with the controller, the controller comprises a preset control software installed therein for driving and controlling the drive mechanism to work.

4. The vision correction method of claim 1, wherein the drive mechanism is a multi-axis drive mechanism, and the tool is a cutting tool.

5. The vision correction method of claim 2, wherein the preset coordinate system $T_G$ comprises three coordinate axes $X_G$-axis, $Y_G$-axis and $Z_G$-axis positioned parallel to the corresponding three coordinate axes X-axis, Y-axis and Z-axis of the basic coordinate system $T_0$ respectively, the coordinate value of the origin $P_0$ of the preset coordinate system $T_G$ is stored into the controller.

6. The vision correction method of claim 5, wherein the two-dimensional visual coordinate system $T_V$ is established by the following steps: adjusting the vision lens to aim at and being parallel to an $X_G Z_G$ plane of the preset coordinate system $T_G$; capturing a two-dimensional picture of the $X_G Z_G$ plane via the vision lens; and establishing the two-dimensional visual coordinate system $T_V$ based on the two-dimensional picture of the $X_G Z_G$ plane of the preset coordinate system $T_G$.

7. The vision correction method of claim 6, wherein, the vision correction method further includes driving the TCP of the tool to move back to its original position $P_1$ before rotating the tool to rotate about another axis of the preset coordinate system $T_G$ by $\theta_2$ degrees.

8. The vision correction method of claim 1, wherein, the vision lens comprises a picture analysis unit for recognizing the TCP and calculating the scaling ratio $\lambda$ of the vision coordinate system $T_V$ relative to the preset coordinate system $T_G$.

9. A vision correction method for tool center point of a robot manipulator, the robot manipulator comprising a main body, a drive mechanism, a tool assembled to a distal end of the main body and having a tool center point (TCP), and a vision lens positioned aside of the tool; the robot manipulator predefining a basic coordinate system $T_0$, the vision correction method comprising the following steps:

defining a preset position $P_0$ of the TCP and establishing a preset coordinate system $T_G$ based on the preset position $P_0$, defining the actual position of the TCP as $P_1$; defining the deviation between the preset position $P_0$ of the TCP and the actual position $P_1$ of the TCP as $\Delta P$ ($\Delta x$, $\Delta y$, $\Delta z$); the preset coordinate system $T_G$ comprising three coordinate axes $X_G$-axis, $Y_G$-axis and $Z_G$-axis positioned parallel to the corresponding three coordinate axes X-axis, Y-axis and Z-axis of the basic coordinate system $T_0$ respectively, the coordinate value of the origin $P_0$ of the preset coordinate system $T_G$ being stored into the controller;

capturing a picture of the actual TCP and establishing a two-dimensional visual coordinate system $T_V$ based on the picture, defining the corresponding coordinate of the actual TCP formed within the two-dimensional visual coordinate system $T_V$ as $P_1'$;

calculating a scaling ratio $\lambda$ of the vision coordinate system $T_V$ relative to the preset coordinate system $T_G$;

driving the tool to rotate relative to the $Z_G$-axis direction of the preset coordinate system $T_G$ by about 180 degrees, capturing a picture of the TCP of the tool thereby obtaining the coordinate value of the TCP of the tool relative to the vision coordinate system $T_V$, and then calculating the value of $\Delta x$;

driving the tool to move back to its original position, and rotating the tool relative to the $Z_G$-axis direction of the preset coordinate system $T_G$ by about 90 degrees, capturing a picture of the TCP of the tool thereby obtaining the coordinate value of the TCP of the tool relative to the vision coordinate system $T_V$, and then calculating the value of $\Delta y$;

driving the tool to move back to its original position, and rotating the TCP of the tool relative to the $Y_G$-axis direction of the preset coordinate system $T_G$ by about 90 degrees, capturing a picture of the TCP thereby obtaining the coordinate value of the TCP relative to the vision coordinate system $T_V$, and then calculating the value of $\Delta z$;

calculating the deviation $\Delta P$ ($\Delta x$, $\Delta y$, $\Delta z$) and comparing the deviation $\Delta P$ with a maximum allowable deviation of the robot manipulator;

wherein, if the deviation $\Delta P$ is less than or equal to the maximum allowable deviation of the robot manipulator, the preset position $P_0$ of the TCP is then considered as the actual position $P_1$ of the TCP thereby finishing the coordinate correction work; if the deviation $\Delta P$ is greater than the maximum allowable deviation of the robot manipulator, then, amending the position parameters of the preset position $P_0$ of the TCP, and repeating the vision correction method for tool center point till the final deviation is less than or equal to the maximum allowable deviation of the robot manipulator.

10. The vision correction method of claim 9, wherein the origin of the basic coordinate system $T_0$ is established at the distal end of the main body, the preset position $P_0$ is an estimated position close to the actual position of the TCP of the tool.

11. The vision correction method of claim 10, wherein the robot manipulator further comprises a base, the drive mechanism is mounted in the main body and connected with the controller, the controller comprises a preset control software installed therein for driving and controlling the drive mechanism to work.

12. The vision correction method of claim 9, wherein the drive mechanism is a multi-axis drive mechanism, and the tool is a cutting tool.

13. The vision correction method of claim 9, wherein, the vision lens comprises a picture analysis unit for recognizing the TCP and calculating the scaling ratio $\lambda$ of the vision coordinate system $T_V$ relative to the preset coordinate system $T_G$.

* * * * *